(12) United States Patent
Fenger et al.

(10) Patent No.: US 8,813,080 B2
(45) Date of Patent: Aug. 19, 2014

(54) SYSTEM AND METHOD TO OPTIMIZE OS SCHEDULING DECISIONS FOR POWER SAVINGS BASED ON TEMPORAL CHARACTERISTICS OF THE SCHEDULED ENTITY AND SYSTEM WORKLOAD

(75) Inventors: Russell J. Fenger, Beaverton, OR (US); Leena K. Puthiyedath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1521 days.

(21) Appl. No.: 11/770,376

(22) Filed: Jun. 28, 2007

(65) Prior Publication Data

US 2009/0007120 A1    Jan. 1, 2009

(51) Int. Cl.
*G06F 9/46* (2006.01)
*G06F 1/00* (2006.01)
*G06F 9/30* (2006.01)

(52) U.S. Cl.
USPC ........... 718/100; 718/102; 718/104; 718/105; 718/106; 718/107; 713/300; 712/214

(58) Field of Classification Search
None
See application file for complete search history.

(56) References Cited

U.S. PATENT DOCUMENTS

| | | | | |
|---|---|---|---|---|
| 5,828,568 | A * | 10/1998 | Sunakawa et al. | 700/79 |
| 5,954,820 | A * | 9/1999 | Hetzler | 713/323 |
| 6,948,171 | B2 * | 9/2005 | Dan et al. | 718/100 |
| 7,096,470 | B2 * | 8/2006 | Brown et al. | 718/102 |
| 7,673,305 | B2 * | 3/2010 | Backer | 718/103 |
| 7,707,578 | B1 * | 4/2010 | Zedlewski et al. | 718/102 |
| 7,779,235 | B2 * | 8/2010 | Singh et al. | 712/214 |
| 2005/0086660 | A1 * | 4/2005 | Accapadi et al. | 718/107 |
| 2006/0095908 | A1 | 5/2006 | Norton et al. | |
| 2008/0222640 | A1 * | 9/2008 | Daly et al. | 718/103 |

OTHER PUBLICATIONS

Office Action received for European Patent Application No. 08251192.4, mailed on Jan. 26, 2011, 2 pages of Office Action.
Office Action received for Chinese Patent Application No. 200810210379.3, mailed on Aug. 31, 2010, 2 pages of English Translation and 3 pages of Office Action.
Extended European Search Report received for European Patent Application No. 08251192.4, mailed on Jul. 7, 2011, 8 pages.
Black, D.L., "Scheduling Support for Concurrency and Parallelism in the Mach Operating System", Computer, IEEE Service Centre, vol. 23, Issue 5, May 1990, pp. 35-43.
Gillespie, Matt, Power Management in the Intel PXA27x Series Application Processors, Apr. 2006.
Office Action from related EP Application 08251192.4 mailed Jun. 10, 2014.
Black, "Scheduling Support for Concurrency and Parallelism in the Mach Operation System", 8153 Computer, 23 (1990), May, No. 5, Los Alamitos, CA.

* cited by examiner

*Primary Examiner* — Adam Lee
(74) *Attorney, Agent, or Firm* — Grossman, Tucker, Perreault & Pfleger, PLLC

(57) ABSTRACT

In some embodiments, the invention involves a system and method to enhance an operating system's ability to schedule ready threads, specifically to select a logical processor on which to run the ready thread, based on platform policy. Platform policy may be performance-centric, power-centric, or a balance of the two. Embodiments of the present invention use temporal characteristics of the system utilization, or workload, and/or temporal characteristics of the ready thread in choosing a logical processor. Other embodiments are described and claimed.

23 Claims, 3 Drawing Sheets

SYSTEM AND METHOD TO OPTIMIZE OS SCHEDULING DECISIONS FOR POWER SAVINGS BASED ON TEMPORAL CHARACTERISTICS OF THE SCHEDULED ENTITY AND SYSTEM WORKLOAD

FIELD OF THE INVENTION

An embodiment of the present invention relates generally to multi-processor or multi-core computing systems and, more specifically, to optimizing operating system (OS) scheduling decisions for power savings, based on temporal characteristics of the scheduled entity and system workload.

BACKGROUND INFORMATION

Most existing operating systems running on multi-processor platforms use a priority-driven, preemptive scheduler in which the highest-priority ready thread runs on any available processor (based on the thread's affinity). Unless a higher priority thread preempts it, a thread will typically ran for a quantum (length of time, or time-slice, a thread is allowed to run before another thread of the same priority runs). Some threads will voluntarily leave the running state prior to their quantum end in order to wait for another operation to complete. This scheme is typically meant to optimize throughput.

The operating system selects the thread to run. Various operations may occur based on how long a thread has been running. In existing systems, the priority of a thread may be dynamically reduced after it has run for a predetermined amount of time. A higher priority thread may trigger an interrupt to cause the other threads to be swapped out and the higher priority thread to run.

If the thread is a long-running thread, also known as a processor-bound thread, that is cache intensive, by being preempted, the thread might be moved to another core that requires another cache. The thread may also be preempted by a short-running thread that only runs briefly. It may not be desirable to preempt the longer running thread that is cache intensive.

BRIEF DESCRIPTION OF THE DRAWINGS

The features and advantages of the present invention will become apparent from the following detailed description of the present invention in which.

DETAILED DESCRIPTION

Current operating system thread schedulers do not take into account the temporal characteristics of the system workload or the temporal characteristics of the ready thread. Both of these provide opportunities for improving the overall power savings of the system. The ability to consolidate short-running threads and reduce disturbances to long-running thread workloads may also increase overall system performance.

An embodiment of the present invention is a system and method relating to optimizing operating system scheduling decisions for power savings with minimal performance loss. One embodiment disclosed herein is a method for adjusting processor selection for a thread based on the temporal characteristics of the system workload. Another embodiment disclosed herein describes a method for adjusting processor selection for a thread based on the temporal characteristics of the thread.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
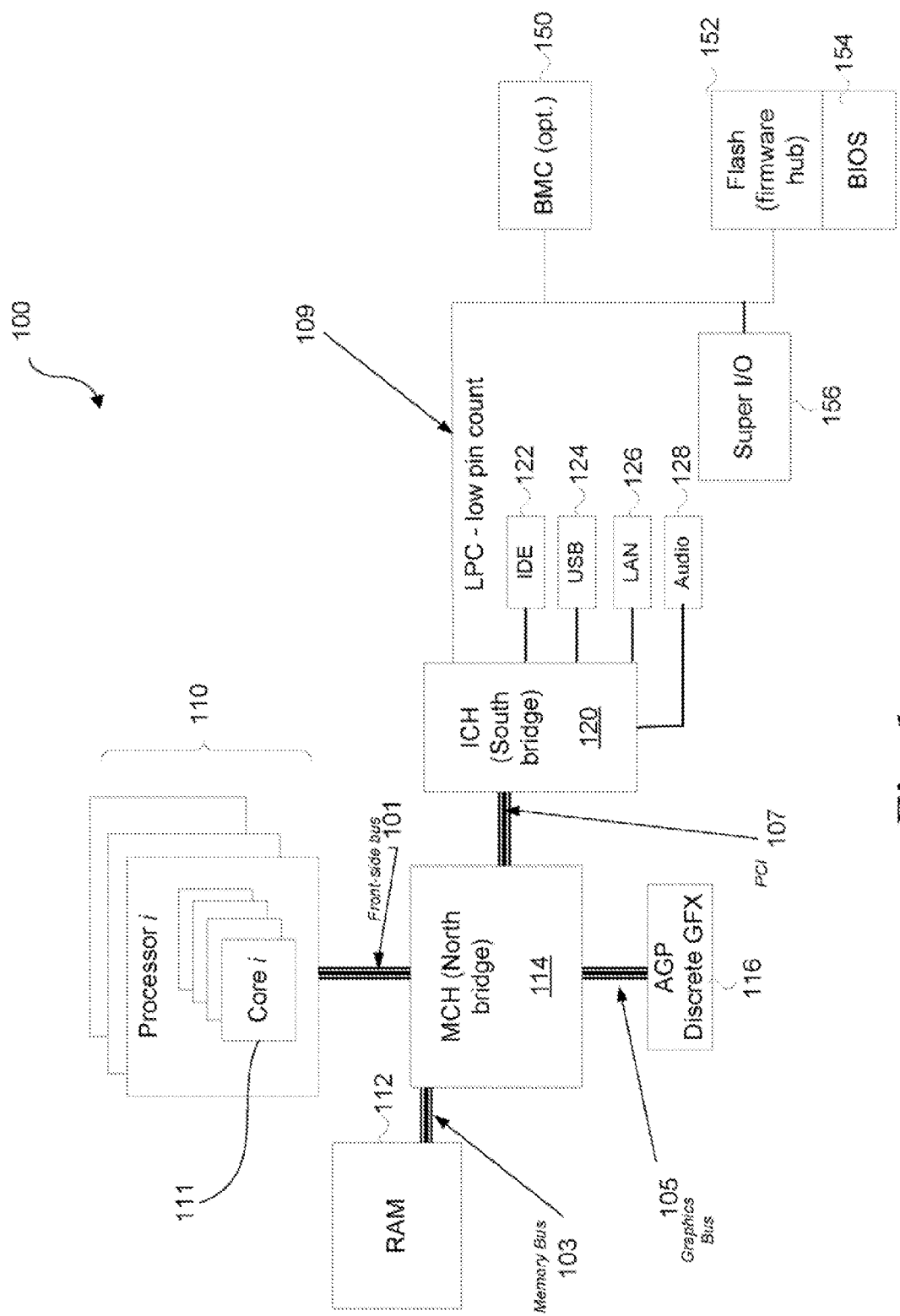
FIG. 1 is a block diagram illustrating an exemplary platform on which embodiments of the invention may be implemented.

FIG. 1 is a block diagram illustrating an exemplary platform 100 on which embodiments of the invention may be implemented. Processor 110 communicates with a memory controller hub (MCH) 114, also known as North bridge, via the front side bus 101. The processor 110 comprises a multi-processing architecture and may have multiple processors and/or multiple cores 111. The MCH 114 communicates with system memory 112 via a memory bus 103. The MCH 114 may also communicate with an advanced graphics port (AGP) 116 via a graphics bus 105. The MCH 114 communicates with an I/O controller hub (ICH) 120, also known as South bridge, via a peripheral component interconnect (PCI) bus 107. The ICH 120 may be coupled to one or more components such as PCI hard drives (not shown), legacy components such as IDE 122, USB 124, LAN 126 and Audio128, and a Super I/O (SIO) controller156 via a low pin count (LPC) bus 156.

Processor 110 may be any type of processor capable of executing software, such as a microprocessor, digital signal processor, microcontroller, or the like. Embodiments of the invention are meant to be implemented on a multi-processor architecture. Thus, processor 110 may comprise one or more processors in platform hardware 100 and one or more of the processors may include multiple threads, multiple cores, or the like.

Memory 112 may be a hard disk, a floppy disk, random access memory (RAM), read only memory (ROM), flash memory, or any other type of medium readable by processor 110. Memory 112 may store instructions for performing the execution of method embodiments of the present invention.

Non-volatile memory, such as Flash memory 152, may be coupled to the IO controller via a low pin count (LPC) bus 109. The BIOS firmware 154 typically resides in the Flash memory 152 and boot up will execute instructions from the Flash, or firmware.

In some embodiments, platform 100 is a server enabling server management tasks. This platform embodiment may have a baseboard management controller (BMC) 150 coupled to the ICH 120 via the LPC 109.

Preempting a long-running cache intensive thread for a short-running thread may be undesirable. In an embodiment, it may be advantageous to schedule a short-running thread on a core that is running other short-running threads. It is thus required to be able to monitor and identify longer running threads. This may be accomplished by maintaining and monitoring a history of thread activity. It may be advantageous to keep historically short-running threads from being preempted, because historically, those threads will not run long anyway, making way for other threads to run.

An embodiment uses temporal characteristics of the processor(s) throughput, as well as historical information related to individual threads to schedule ready threads through the processor(s) and cores. Temporal characteristics may include how long a thread runs each time it is allowed to run, i.e., cumulative running time. For instance, if a thread runs for the entire quantum allowed, it may be characterized as a long-running thread. If a thread runs for only 0.01% of the allowed quantum, it may be characterized as a short-running thread. It will be understood that various thresholds may be used to accommodate various priority schemes and applications. In some embodiments, a thread may be characterized as short-running if it completes in any percentage of the quantum less than 100%. Another characteristic that may be tracked is, historically, how many quantums a thread uses to fully complete. In an embodiment, thread history is tracked for at least the last time the thread was allowed to run. In other embodiments, multiple runs of a thread are tracked. Historical data may be limited by the size of the storage area where history is kept. There is some overhead related to the amount of history kept.

In existing systems, there may be some information kept regarding cumulative time used to run a given thread. Additional temporal characteristics are used for embodiments of the present invention. A mechanism for identifying whether threads are "long-running" or short-running" is used in embodiments of the present invention to aid in scheduling threads. Modification to existing operating systems may be required to collect the appropriate accounting methods.

In existing systems, the quantum may be increased or decreased based on the running time of a thread. However, there is currently no mechanism for scheduling threads by core or processor based on the temporal characteristics of the thread and processor, overall. Existing systems do not use the accounting data for processor or core selection.

In the following discussion, C-states and P-states of the processors are discussed. A C-state identifies processor idleness. A deeper C-state may indicate more power saving is possible. A shallow C-state means that a processor has not been idle long and would not be in a high power saving state. Idleness is a factor of how many work threads are running on the processor. When no threads are running on the processor, it would be in a deep C-state. P-states control the frequency at which a processor is run. If the processor is at a higher P-state, it is running at a higher frequency, and similarly, if a processor is at a lower P-state, it is running at a lower frequency. Frequency and voltage states determine P-state of a processor, in contrast to throttling, which indicates a change in clock speed.

Figure 2:
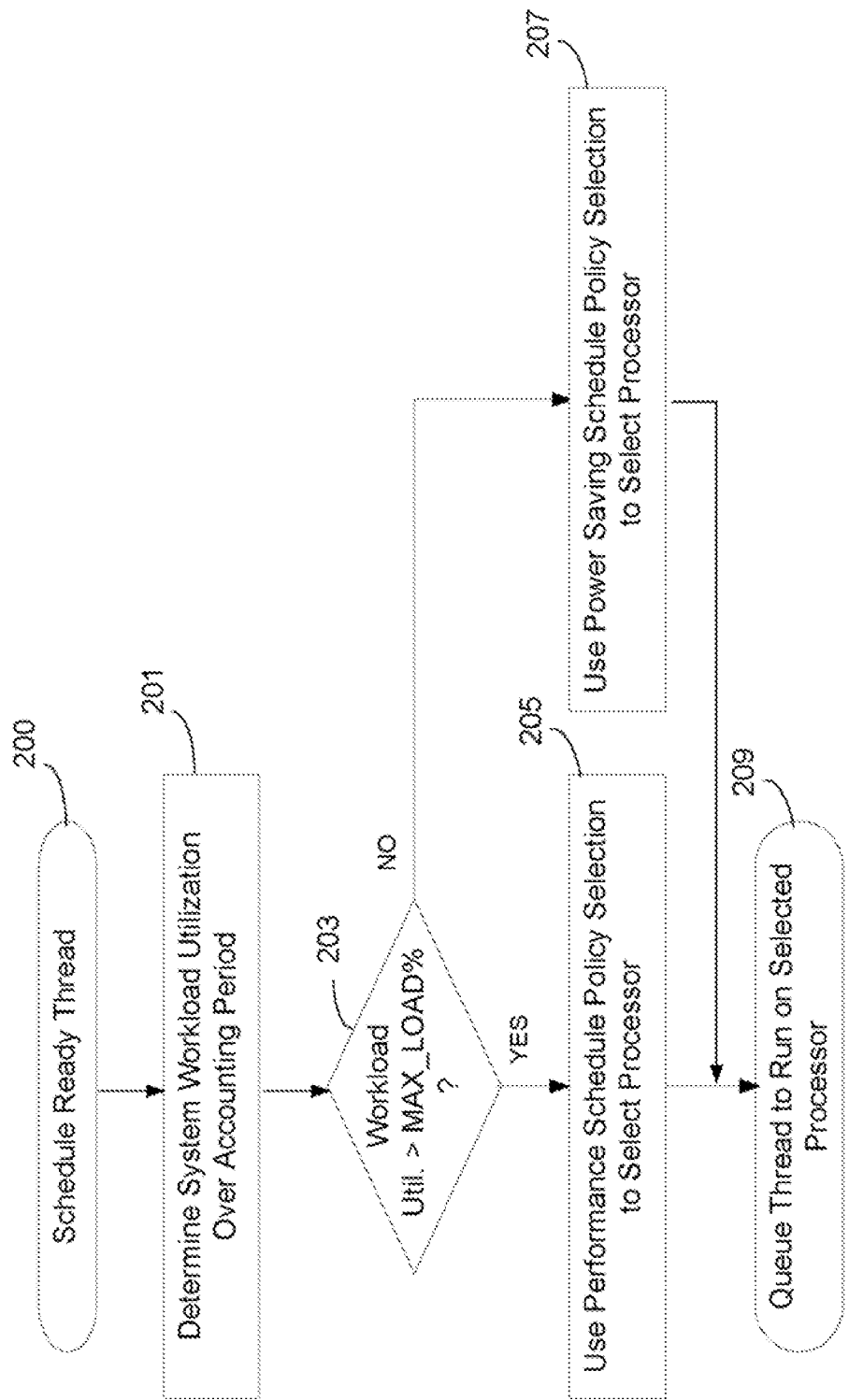
FIG. 2 is a flow diagram illustrating a method for adjusting processor selection for a ready thread based on temporal characteristics of the system workload, according to an embodiment of the invention.

FIG. 2 is a flow diagram 200 illustrating a method for adjusting processor selection for a ready thread based on temporal characteristics of the system workload. In an embodiment, the system workload utilization over an accounting period is identified, in block 201. An accounting period may be over the last timer tick, or over several timer ticks. When the system utilization is high, typically all processors are currently over-utilized (above some pre-set utilization percentage). A determination is made as to whether the system workload exceeds a predetermined threshold (MAX-LOAD %), in block 203. This threshold may be changed by the platform administrator. The system utilization typically refers to the overall system load. Loads of individual packages (processing nodes) may be looked at, but the system load does not typically look at individual logical processors. In the context of this disclosure, a logical processor means the lowest unit on which a thread may be run. Depending on the system architecture, it may be a physical processor in a socket, a core in a multi-core processor, a thread unit, or other physical processing unit. The overall system utilization may help in determining which policy should be used to determine on which core or processor to schedule the ready thread.

If the threshold is exceeded, then the scheduler may use the performance scheduler policy to select on which processor the thread will run, in block 205. The performance scheduler policy determines the processor on which to run the ready thread to achieve the best performance (e.g. run the thread on a package that has no other cores busy, or run the thread on a processor that is not sharing a cache with a busy core). There may be other criteria considered, for instance cache utilization, cache sharing, cooperative cache sharing, bus utilization by other threads, etc. Bus utilization for memory, disk, I/O, etc., may also be considered when scheduling. Threads that are sharing resources (e.g. same threads using the same memory) may be scheduled to run on same package or to use the same cache in order to get better performance. A lower priority thread may less important when considering performance.

When the system utilization is low, as determined in block 203, as being below the threshold, all processors are typically currently under-utilized (below some pre-set utilization percentage). In this case, the scheduler may use a power saving schedule policy to select on which processor the thread will run, in block 207. In one embodiment, an exemplary power saving scheduler policy using temporal characteristics of running threads is further described in conjunction with FIG. 3. The power saving scheduler policy determines the processor on which to run to achieve the best power savings.

In an embodiment, some possible criteria for the power saving schedule policy are: 1) run the thread on a package that already has active cores, 2) run the thread on processors that are in the shallowest C-state, 3) run the thread on processors that are in the lowest P-states, or 4) run the thread on processors that are at the lowest temperature. Once the appropriate processor is selected, the thread is queued to run on the selected processor in block 209.

The current power policy and environment of the platform may drive which scheduling policy is to be used. For instance, if the platform is running on battery, it may be desirable to optimize power savings rather than performance. If the system utilization is low enough that the thread will cause no detrimental impact to performance, then taking the power savings by running the thread on an active core, regardless of whether it is long or short-running may be desirable. Power saving vs. performance maximization policies may be set in the operating system. If the platform is one of many in an enterprise data center, it may be desirable to minimize temperature. In existing systems, there are typically three general modes: power saving mode; performance mode; and a balanced mode. These modes may be a combination of user selectable and physical environmental modes, i.e., when a platform is unplugged from an AC power source, it will run on battery power—a physical characteristic of the platform environment.

Figure 3:
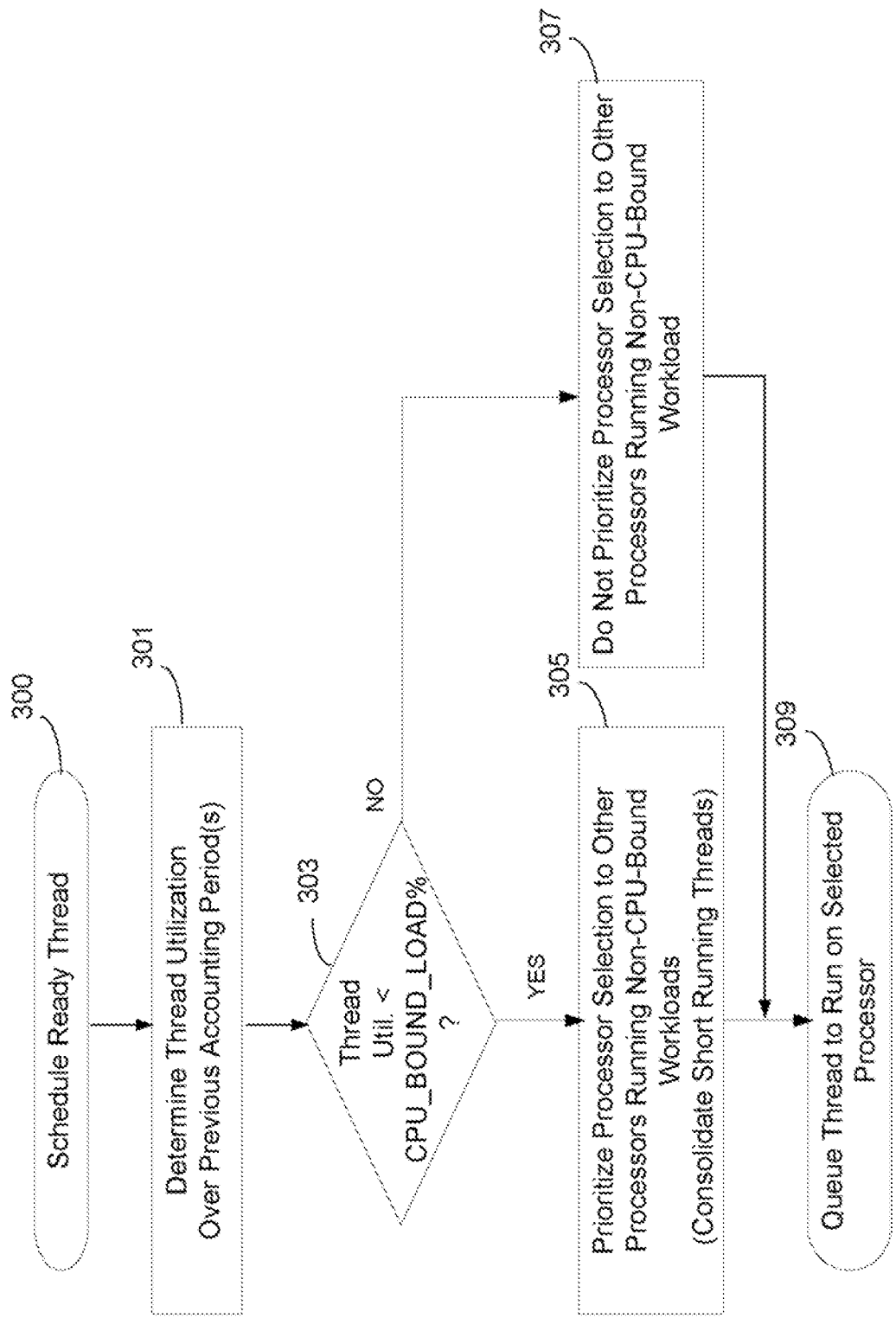
FIG. 3 is a flow diagram illustrating a method for adjusting processor selection for a ready thread based on the temporal characteristics of the thread.

FIG. 3 is a flow diagram 300 illustrating a method for adjusting processor selection for a ready thread based on the temporal characteristics of the thread. In an embodiment, the thread utilization over one or more previous accounting periods is identified, i.e., determine the thread temporal characteristics over previous execution period(s), in block 301. Modifications of existing operating systems may be required to collect historical accounting data required in the following discussion. If the thread demonstrates a history of high utilization by consistently executing for an entire quantum, then this thread would be classified as a "processor-bound thread," or "long-running thread." Classification of threads based on their utilization allows for novel adjustments in idle processor selection for a ready thread on systems that are partially idle, resulting in additional energy savings. If the thread utilization is below a predetermined threshold, as determined in block 303, defined to be non-processor-bound, then the processor selection may be prioritized to other processors running non-processor-bound workloads, in block 305. If the thread is processor-bound, then processor selection need not be prioritized to other non-processor-bound processors, as shown in block 307. Once the appropriate processor is selected, the thread is queued to run on the selected processor in block 309.

Some example policies based on a thread's temporal characteristics include: 1) short-running threads (e.g. periodic system threads) may be consolidated to run on processors already running short-running threads, which will allow idle processors that may be in deep C-states to stay in deep C-states; 2) reduce the frequency of threads that are not processor-bound from preempting threads that are processor-bound and thereby reduce frequency of migration of processor-bound threads. Not only will processor-bound threads gain performance due to a reduction in thread migration, but the reduced disturbance to idle cores will increase "turbo" mode opportunities on systems capable of single-core or multi-core turbo mode; and 3) increase performance per watt by using performance scheduling policy for processor-bound threads and power saving scheduling policy for non-processor-bound threads. Turbo mode, which may be enabled using "dynamic frequency management," may be available to some processors. More information about dynamic frequency management may be found in "Power Management in the Intel® PXA27x Series Application Processors," by Matt Gillespie, Intel Corp. April 2005. In the context of the present disclosure, turbo mode means that if some cores are not busy, or are idle, some cores may perform at a higher frequency than a guaranteed advertised high frequency.

When no historical data exists for a ready thread, for instance, it has never run before, an embodiment assumes that the ready thread is to be a long-running thread. This is done to reduce the risk of making a performance impact from the thread.

If all logical processors are running threads, and none is immediately available for a ready thread, other criteria may be used to determine on which processor to run the thread. The "ideal" processor, as defined by the OS, might be selected. The last processor on which the thread ran might be selected, to take advantage of cache that may still be populated (warm), etc. If necessary, thread migration may be possible to consolidate short-running threads on the same logical processor. It may be undesirable to migrate processor-intensive, or long-running threads, due to the overhead required. For instance, the long-running thread may be using data in a cache local to the logical processor it is currently running on. In some cases, it may actually be advantageous, for performance reasons, to migrate a long-running thread that is sharing a cache with another thread to another processor that does not have any current cache activity in order to reduce cache contention.

In an embodiment, the processes shown in FIGS. 2 and 3 may be used together to optimize selection of a logical processor on which to run a ready thread. In this embodiment, in the method of FIG. 2, when a power saving policy is selected (block 207), a method as shown in FIG. 3 may be performed. In other words, when the system utilization is determined to be amenable to power saving techniques because the utilization is less than the threshold, thread utilization may then be determined, in block 301 (FIG. 3). It will be understood that these techniques may be combined in various ways depending on policy made by system administrators and/or based on user applications running on the platform.

In other embodiments, the methods of FIGS. 2 and 3 may be used separately, based on platform policy.

Embodiments of the present invention are intended to enhance an operating system's ability to schedule ready threads, specifically to select a logical processor on which to run the ready thread, based on platform policy. Platform policy may be performance-centric, power-centric, or a balance of the two. Embodiments of the present invention use temporal characteristics of the system utilization, or workload, and/or temporal characteristics of the ready thread in choosing a logical processor. The ability to consolidate short-running threads and reduce disturbances to processor-bound workloads may increase overall system performance. Embodiments of the present invention may increase performance/watt on partially idle systems and improve benefits of deep C-states. Embodiments may also reduce thread migration and enable turbo opportunities.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for optimizing scheduling of a ready thread, comprising:
    a processor comprising a plurality of logical processors, coupled to memory;
    an operating system (OS) to execute on the processor, the OS to make scheduling decisions for a plurality of ready threads;
    logic to monitor and store historical temporal characteristics of system utilization in the memory;
    logic to monitor and store in the memory historical temporal characteristics of a plurality of threads that have run on at least one logical processor of the system; and
    logic to select a logical processor of the plurality of logical processors on which to run a ready thread, the selection being based on, at least in part, a platform policy criteria, and one or more of the historical temporal characteristics of the system utilization or one or more of the historical temporal characteristics of the plurality of threads that have run;
    wherein the platform policy criteria defines when to use one of a performance-centric policy, a power-savings-centric policy, or a balanced policy, the criteria utilizing the historical temporal characteristics of at least one of the system utilization and the plurality threads that have run;
    wherein the historical temporal characteristics of the plurality of threads that have run include whether a thread is one of a short-running thread or a long-running thread; and
    wherein the logical processor selected for a short-running thread is executing other short-running threads.

2. The system as recited in claim 1, wherein when the system utilization is above a predetermined threshold the platform policy is selected from a set of performance-centric policies, and when the system utilization is below the predetermined threshold, the platform policy is selected from a set of power-saving-centric policies.

3. The system as recited in claim 2, wherein the selected performance-centric policy drives selection of a logical processor from one of a logical processor that has no other cores busy, or a logical processor that is not sharing a cache with a busy core.

4. The system as recited in claim 3, wherein selection of the processor also depends on cache utilization, cache sharing, cooperative cache sharing, and bus utilization by other threads on the plurality of logical processors.

5. The system as recited in claim 2, wherein the selected power-saving-centric policy drives selection of the logical processor based on active cores in the plurality of the logical processors, C-states of the plurality of logical processors, P-states of the logical processors, and/or temperature of the logical processors, wherein selection of a logical processor is one of a logical processor having one or more active cores, a logical processor having a shallow C-state, a logical processor having a low P-state or a logical processor having a low temperature, based on the power-saving-centric policy.

6. A method for optimizing scheduling of a plurality of ready threads, comprising:
    identifying a system workload utilization for a platform for a predetermined time interval;
    determining whether the system workload utilization exceeds a predetermined threshold;
    if the system workload utilization exceeds the predetermined threshold, then selecting one of a plurality of logical processors on the platform to run one of the plurality of ready threads, the selection being based on a performance schedule policy;
    if the system workload utilization does not exceed the predetermined threshold, then selecting one of a plurality of logical processors on the platform to run one of the plurality of ready threads, the selection being based on a power saving schedule policy;
    identifying thread utilization for threads that have run on a platform for a predetermined time interval, the identifying comprising characterizing a running thread as one of a short-running thread or a long-running thread;

identifying thread utilization for a ready thread to be run on the platform; and using the thread utilization characteristics in conjunction with the system workload utilization characteristics to select a platform policy for use in scheduling the ready thread; and queuing the ready thread to run on the selected logical processor, wherein the logical processor selected for a short-running thread is executing other short-running threads.

7. The method as recited in claim 6, wherein the performance schedule policy drives selection of a logical processor based on a determination of expected performance, wherein the selection is one of running the ready thread on a package that has no other cores busy, or running the ready thread on a processor that is not sharing a cache with a busy core.

8. The method as recited in claim 6, wherein the performance schedule policy uses information related to cache utilization, cache sharing, cooperative cache sharing, shared resources among threads, thread priority, and bus utilization by other threads in determining on which logical processor to run the ready thread.

9. The method as recited in claim 6, wherein when historical temporal information for the ready thread does not exist, assuming the thread to be a long-running thread.

10. A method for optimizing scheduling of a plurality of ready threads, comprising:

identifying thread utilization for threads that have run on a platform for a predetermined time interval, the identifying comprising characterizing the plurality of running threads as one of a short-running thread or a long-running thread;

identifying thread utilization for one of the plurality of ready threads to be run on the platform;

determining whether a ready thread utilization exceeds a predetermined threshold;

if the ready thread utilization does not exceed the predetermined threshold, then prioritizing selection of a logical processor to a logical processor executing non-processor bound threads, thereby consolidating short-running threads and minimizing thread migration;

if the ready thread utilization exceeds the predetermined threshold, then selecting one of a plurality of logical processors on the platform to run the ready thread without prioritizing the selection based on logical processors running non-processor-bound threads; and queuing the ready thread to run on the selected logical processor; and wherein the logical processor selected for a short-running thread is executing other short-running threads and the logical processor selected for running long-running threads is executing other long-running threads.

11. The method as recited in claim 10, wherein the selecting of a logical processor on which to run the ready thread further comprises: utilizing a platform policy based on characteristic and policy criteria to include consolidating short-running threads.

12. The method as recited in claim 10, wherein the selecting of a logical processor on which to run the ready thread further comprises: utilizing a platform policy based on characteristic and policy criteria to include reducing short-running thread preemption frequency.

13. The method as recited in claim 10, wherein the selecting of a logical processor on which to run the ready thread further comprises: utilizing a platform policy based on characteristic and policy criteria to include using performance scheduling policy for processor-bound threads.

14. The method as recited in claim 10, wherein the selecting of a logical processor on which to run the ready thread further comprises: utilizing a platform policy based on characteristic and policy criteria to include using a power saving scheduling policy for non-processor-bound threads.

15. A non-transitory machine readable storage medium having instructions for optimizing scheduling a plurality of ready threads, when the instructions are executed on a machine, cause the machine to:

identify a system workload utilization for a platform for a predetermined time interval;

determine whether the system workload utilization exceeds a predetermined threshold;

if the system workload utilization exceeds the predetermined threshold, then select one of a plurality of logical processors on the platform to run one of the plurality of ready threads, the selection being based on a performance schedule policy;

if the system workload utilization does not exceed the predetermined threshold, then select one of a plurality of logical processors on the platform to run one of the plurality of ready threads, the selection being based on a power saving schedule policy;

identify thread utilization for threads that have run on a platform for a predetermined time interval, the identifying comprising characterizing a running thread as one of a short-running thread or a long-running thread;

identify thread utilization for a ready thread to be run on the platform;

use the thread utilization characteristics in conjunction with the system utilization characteristics to select a platform policy for use in scheduling the ready thread; and queue the ready thread to run on the selected logical processor, wherein the logical processor selected for a short-running thread is executing other short-running threads.

16. The non-transitory medium as recited in claim 15, wherein the performance schedule policy drives selection of a logical processor based on a determination of expected performance, wherein the selection is one of running the ready thread on a package that has no other cores busy, or running the ready thread on a processor that is not sharing a cache with a busy core.

17. The non-transitory medium as recited in claim 15, wherein the performance schedule policy uses information related to at least one of cache utilization, cache sharing, cooperative cache sharing, shared resources among threads, thread priority, and bus utilization by other threads in determining on which logical processor to run the ready thread.

18. The non-transitory medium as recited in claim 15, wherein when historical temporal information for the ready thread does not exist, further comprising instructions to assume the thread to be a long-running thread.

19. A non-transitory machine readable storage medium having instructions for optimizing scheduling a plurality of ready threads, when the instructions are executed on a machine, cause the machine to:

identify thread utilization for threads that have run on a platform for a predetermined time interval, the identifying comprising characterizing the plurality of running threads as one of a short-running thread or a long-running thread;

identify thread utilization for one of the plurality of ready threads to be run on the platform;

determine whether a ready thread utilization exceeds a predetermined threshold;

if the ready thread utilization does not exceed the predetermined threshold, then prioritize selection of a logical processor to a logical processor executing non-processor bound threads, thereby consolidating short-running threads and minimize thread migration;

if the ready thread utilization exceeds the predetermined threshold, then select one of a plurality of logical processors on the platform to run the ready thread without prioritizing the selection based on logical processors running non-processor-bound threads; and queue the ready thread to run on the selected logical processor; and wherein the logical processor selected for a short-running thread is executing other short-running threads and the logical processor selected for a long-running thread is executing other long-running threads.

20. The non-transitory medium as recited in claim 19, wherein the selecting of a logical processor on which to run the ready thread further comprises instructions to: utilize a platform policy based on characteristic and policy criteria to include consolidating short-running threads.

21. The non-transitory medium as recited in claim 19, wherein the selecting of a logical processor on which to run the ready thread further comprises instructions to: utilize a platform policy based on characteristic and policy criteria to include reducing short-running thread preemption frequency.

22. The non-transitory medium as recited in claim 19, wherein the selecting of a logical processor on which to run the ready thread further comprises instructions to: utilize a platform policy based on characteristic and policy criteria to include using performance scheduling policy for processor-bound threads.

23. The non-transitory medium as recited in claim 19, wherein the selecting of a logical processor on which to run the ready thread further comprises instructions to: utilize a platform policy based on characteristic and policy criteria to include using power saving scheduling policy for non-processor-bound threads.

* * * * *

UNITED STATES PATENT AND TRADEMARK OFFICE
CERTIFICATE OF CORRECTION

PATENT NO.         : 8,813,080 B2                              Page 1 of 1
APPLICATION NO.    : 11/770376
DATED              : August 19, 2014
INVENTOR(S)        : Russell J. Fenger et al.

It is certified that error appears in the above-identified patent and that said Letters Patent is hereby corrected as shown below:

In the Claims,

In column 8, line 14, in claim 1, delete "utilizing the historical" and insert -- utilizing --, therefor.

In column 8, line 15, in claim 1, delete "and the plurality" and insert -- and --, therefor.

In column 10, line 31, in claim 15, delete "system" and insert -- system workload --, therefor.

In column 11, line 5, in claim 19, delete "minimize" and insert -- minimizing --, therefor.

Signed and Sealed this
Eleventh Day of November, 2014

Michelle K. Lee
*Deputy Director of the United States Patent and Trademark Office*